US011067697B2

(12) United States Patent
Boudaud (10) Patent No.: US 11,067,697 B2
(45) Date of Patent: Jul. 20, 2021

(54) METHOD AND SYSTEM FOR PROVIDING ASSISTANCE TO GEOLOCATION OF NODE DEVICES OF AN ASYNCHRONOUS RF NETWORK

(71) Applicant: ABEEWAY, Meylan (FR)

(72) Inventor: Stéphane Boudaud, Grasse (FR)

(73) Assignee: ABEEWAY, Meylan (FR)

(*) Notice: Subject to any disclaimer, the term of this patent is extended or adjusted under 35 U.S.C. 154(b) by 393 days.

(21) Appl. No.: 16/319,601

(22) PCT Filed: Jul. 24, 2017

(86) PCT No.: PCT/EP2017/068689
§ 371 (c)(1),
(2) Date: Jan. 22, 2019

(87) PCT Pub. No.: WO2018/015574
PCT Pub. Date: Jan. 25, 2018

(65) Prior Publication Data
US 2021/0103057 A1 Apr. 8, 2021

(30) Foreign Application Priority Data
Jul. 22, 2016 (FR) ................................. 16305944

(51) Int. Cl.
G01S 19/05 (2010.01)
G01S 19/09 (2010.01)
G01S 19/25 (2010.01)

(52) U.S. Cl.
CPC ............. *G01S 19/05* (2013.01); *G01S 19/09* (2013.01); *G01S 19/256* (2013.01); *G01S 19/258* (2013.01)

(58) Field of Classification Search
CPC .......... G01S 19/05; G01S 19/06; G01S 19/07; G01S 19/09; G01S 19/256; G01S 19/258
USPC ...................................................... 342/357.42
See application file for complete search history.

(56) References Cited

U.S. PATENT DOCUMENTS

| 5,752,218 A | 5/1998 | Harrison et al. |
| 6,104,978 A | 8/2000 | Harrison et al. |
| 7,026,987 B2* | 4/2006 | Lokshin ................. G01S 19/24 342/357.28 |

(Continued)

OTHER PUBLICATIONS

International Search Report from corresponding International Application No. PCT/EP2017/068689, dated Jan. 15, 2018, pp. 1-5, European Patent Office, Rijswijk, The Netherlands.

*Primary Examiner* — Harry K Liu
(74) *Attorney, Agent, or Firm* — Hauptman Ham, LLP (57) ABSTRACT

Where each node device is assumed to know the time-of-day with an accuracy of only plus or minus 1 second, the geolocation of said node device is determined by an A-GNSS server by help of a time-stamp known with an accuracy better than or equal to 10 milliseconds and added by at least one transceiver of the asynchronous RF network. Indeed, the technical feature of said asynchronous RF network according to which the time-of-day at which data are sent from each node device is known in a deterministic manner allows the A-GNSS server to determine retrospectively this time-of-day in function and with the precision of the time-stamp added by said at least one transceiver to the data packet issued from said node device over the asynchronous RF network.

16 Claims, 2 Drawing Sheets

(56) References Cited

U.S. PATENT DOCUMENTS

| | | | | |
|---|---|---|---|---|
| 7,626,539 | B2* | 12/2009 | de Salas | G01S 19/03 |
| | | | | 342/357.31 |
| 8,340,686 | B2* | 12/2012 | Bartlett | G01S 5/0284 |
| | | | | 455/456.1 |
| 8,457,682 | B2* | 6/2013 | Raab | G01C 21/3682 |
| | | | | 455/550.1 |
| 8,755,816 | B2* | 6/2014 | Kangas | H04W 4/02 |
| | | | | 455/456.1 |
| 8,909,661 | B2* | 12/2014 | Ojanpera | G06F 16/489 |
| | | | | 707/758 |
| 9,066,311 | B1* | 6/2015 | Sherman | G01S 11/08 |
| 10,225,028 | B2* | 3/2019 | Rahman | H04W 24/08 |
| 10,254,408 | B2* | 4/2019 | Farrokhi | G01S 5/10 |
| 2004/0008660 | A1* | 1/2004 | Lee | H04W 88/02 |
| | | | | 370/349 |
| 2008/0096527 | A1* | 4/2008 | Lamba | G01S 19/05 |
| | | | | 455/411 |
| 2016/0044651 | A1 | 2/2016 | Lu | |

* cited by examiner

METHOD AND SYSTEM FOR PROVIDING ASSISTANCE TO GEOLOCATION OF NODE DEVICES OF AN ASYNCHRONOUS RF NETWORK

FIELD OF THE INVENTION

The present invention relates generally to geolocation capable devices based on a global navigation satellite system (GNSS), such as the global positioning system (GPS) and more specifically to those of these devices that must connect to a radio frequency (RF) network, such as a RF wide area network (WAN), enabling asynchronous communications. The present invention is particularly advantageous when applied to a low-power network, such as a low-power WAN (LPWAN), enabling not only asynchronous communications but also long range and low power consumption of battery-operated node devices.

BACKGROUND OF THE INVENTION

The Internet of Things (IoT) has triggered the development of RF WAN and more particularly LPWAN where node devices are designed to wake up from time to time and, whenever they wake up, to emit potentially asynchronously a small amount of data intended to be received by a transceiver of said RF WAN. According to this operating mode, the consumption of said node devices is advantageously low or very low so that they can be battery-operated while working over an extensive period of time, measuring in months or even years, without requiring any maintenance and replacement of their power sources.

Typically, a battery-operated node is a tag or beacon that comprises a micro-controller and radio frequency (RF) circuitry designed to give information about the things or individuals they are tied to.

Some applications where battery-operated nodes are intended to be used may require the determination of their current geographic location. This is particularly useful for applications where one needs to manage such things as a large stock of all sorts of goods and products possibly randomly spread over a large area like, for example, a fleet of cars on a parking lot waiting to be shipped. In this case, each tag comprises, additionally to said micro-controller and radio frequency (RF) circuitry, a GNSS receiver necessary to operate such a tag so that a geolocation of the thing it is tied to can be obtained.

However, including a GNSS receiver into a node device of a RF WAN, more particularly a LPWAN, enabling long range and asynchronous communications does not go without posing serious problems, notably as far as the power consumption of the tag is concerned. Indeed, in this framework, neither the use of complete standalone GNSS, nor the use of known assisted GNSS can be considered.

To determine the geographic position of a node device of a RF WAN, according to a complete standalone GNSS, the node device has to download information about the GNSS constellation of satellites, such as orbital information of satellites among which so-called ephemerides (each ephemeris is a set of data, such as parameters, which allows a GNSS receiver to calculate precise orbit of a corresponding satellite) and almanac (which contains coarse orbits and status information of satellites). Because the data rate of any GNSS signal is only of 50 bits per second (bps), the downloading of said orbital information takes a long time, i.e. approximately 2 min for downloading an ephemeris. Moreover, each ephemeris remaining valid for only a few hours, the downloading of up-to-date ephemerides is potentially required each time the node device is waked up. Furthermore, if the GNSS signals are lost for only 20 mSec during the downloading, this latter may be discarded and restarted from the beginning, because ephemerid signals do not have any error correction code; therefore losing a single bit requires a new full download. Each of these constraints implies a prohibitive increase of power consumption of the node device and the use of complete standalone GNSS cannot be considered to determine the geographic position of a node device that must either connect to a RF WAN as far as the power consumption of the node device is concerned or connect to a LPWAN having a low or very low data rate transmission.

To reduce the response time called 'time to first fix' or TIFF of GNSS receivers connected to a conventional WAN enabling long range and synchronous communications, assisted GNSS or A-GNSS has been devised so that the ephemerides and other pieces of data that need to be updated once every a few hours (i.e. every 6 hours or less) are rather downloaded by A-GNSS capable devices from an A-GNSS assistance server whose role is to download orbital information like ephemerides and store it in a database made accessible to all A-GNSS capable devices connected to the conventional WAN. Because synchronous or non-asynchronous mobile networks, like the world-wide global system for mobile communications or GSM, and other local RF networks, like Wi-Fi, all deliver high speed communication rates, the downloading of orbital information by A-GNSS capable devices is performed from the database in much less time than directly from satellites.

Unfortunately, LPWAN do not offer this capability. Because wide communication ranges and low power are obtained at the expense of a low or very low data rate, downloading the needed orbital information from a network database through a LPWAN takes too much time and then is not a solution. LPWAN network data rates are typically between 50 bps (bit per second) to 5 kbit/sec. In some cases, the bit rate is adapted depending on the quality of the radio link between the node devices and other components of the LPWAN network. Therefore, from a system design point of view, the lowest possible data rate must always be considered.

Moreover, downloading needed orbital information from a network database through a RF WAN enabling asynchronous communications implies a significant power consumption incompatible with the use of battery-operated node devices intended to work over an extensive period of time without requiring any maintenance and replacement of their power sources and then the use of A-GNSS cannot be considered as such to determine the geographic position of such node devices connected to a RF WAN.

It is thus an overall object of the invention to overcome at least partially at least one of the above problems.

It is an object of the invention to provide a solution that allows a GNSS receiver included into a node device to operate from a RF network enabling asynchronous and preferably long range communications, particularly while maintaining a low or very low power consumption of the node device.

It is another or additional object of the invention to provide a solution that allows a GNSS receiver included into a node device to operate from a LP network, preferably a LPWAN, enabling asynchronous communications, particularly while obtaining a response time compatible with the low or very low data rate transmission of this type of network and/or with the applications the node device is provided for.

SUMMARY OF THE INVENTION

To at least one of these ends, it is provided a method for providing assistance to geolocation of at least one node device of an asynchronous radio frequency (RF) communication network, preferably a wide area network (WAN), preferably enabling long range communications, by implementing at least one transceiver, each of said at least one node device comprising a global navigation satellite system (GNSS) receiver, the method comprising the steps consisting in:

At the level of said GNSS receiver of said at least one node device:
receiving at least three GNSS signals from visible GNSS satellites, i.e., GNSS satellites that are visible to the GNSS receiver,
computing data, in function of, and preferably proportional to, at least two time of arrival differences between receptions of predetermined signal sequences of said at least three GNSS signals taken in pairs;
generating a data packet comprising said data proportional to said at least two time of arrival differences, and
asynchronously emitting the data packet towards said at least one transceiver; and
At the level of said at least one transceiver:
receiving said data packet, and
adding a time-stamp to said data packet for generating a time-stamped data packet.

The resulting technical effect is that, where each node device is assumed to know the time-of-day with an accuracy of only plus or minus 1 second (that is an insufficient accuracy for geolocation purposes), the geolocation of said node device may be determined by help of a time-stamp known with a better accuracy and advised by at least one transceiver of the asynchronous RF network.

Optionally, the invention has any of the following facultative features that can be used separately or in combination.

According to an optional embodiment, the method comprises, after said step of adding a time-stamp to said data packet, emitting said time-stamped data packet toward an A-GNSS server.

According to an embodiment, the time-stamp is determined with an accuracy of plus or minus 1 millisecond, preferably plus or minus 8 microseconds.

According to an embodiment, the time-stamp is added immediately upon reception of the data packet at the at least one transceiver.

According to an embodiment, with said at least one node device comprising a non-transitory computer readable medium for storing at least data about its position with an accuracy of less than three hundreds kilometers, preferably less than one hundred kilometers, said data packet further carries said data about the position of said at least one node.

According to an embodiment, with said at least one node device comprising a real time clock (RTC) for knowing the time-of-day with an accuracy of plus or minus one second and a non-transitory computer readable medium for storing at least an almanac of a GNSS constellation of satellites and data about its position with an accuracy of less than three hundreds kilometers, preferably less than one hundred kilometers, the method further comprises:

According to an embodiment, at the level of said GNSS receiver of said at least one node device:
determining which satellites of the GNSS constellation are visible according to said almanac in function of said data about the position of said at least one node device and the time-of-day given by the RTC of said at least one node device, and
picking at least three visible satellites of the GNSS constellation to listen for said at least three GNSS signals.

According to an embodiment, the method further comprises, with said at least one transceiver comprising a non-transitory computer readable medium for storing data about its position:
At the level of said at least one transceiver:
adding data about the position of said at least one transceiver, in addition to the time-stamp, for generating the time-stamped data packet.

According to an embodiment, each signal sequence is emitted periodically with a period inferior to 10 milliseconds, preferably equal to 1 millisecond.

According to an embodiment, the asynchronous RF network is a Wide Area Network (WAN). According to an embodiment, the asynchronous RF network is a low-power network, preferably a low-power WAN (LPWAN). According to an embodiment, the asynchronous RF network enables long range communications. According to an embodiment, the asynchronous RF network has a throughput that does not exceed 1000 bits per second (bps) and may be as low as 50 bps.

According to an embodiment, asynchronously emitting the data packet issued from said at least one node device is performed after a determined delay, said data packet further carrying a value of said determined delay, said determined delay being potentially randomly generated by said at least one node device. More particularly, asynchronously emitting the data packet issued from said at least one node device may be performed repeatedly, for instance according to a determined number of times.

According to an embodiment, said at least one node device comprises at least one battery-operated node device intended to work over an extensive period of time without requiring any maintenance and replacement of their power sources.

According to an embodiment, with the asynchronous RF network being connected through at least one transceiver acting as a gateway to a backend network which houses an A-GNSS server, the method further comprises:
At the level of said at least one transceiver acting as a gateway:
sending said time-stamped data packet to said A-GNSS server,
At level of said A-GNSS server, which is located outside said asynchronous RF network:
receiving said time-stamped data packet,
extracting the time-stamp and said data proportional to said at least two time of arrival differences from said time-stamped data packet, and
for at least one time of arrival difference, determining the time-of-day at which data proportional to said at least time of arrival difference have been computed by said at least one node in function of the extracted data among which at least the extracted time-stamp.

According to an embodiment, said at least one transceiver is directly connected to said backend network.

According to another embodiment, with the A-GNSS server storing characteristic data about the asynchronous RF network, said characteristic data comprising at least one among a deterministic time of arrival through the asynchronous RF network to said at least one transceiver acting as a gateway and a geographic span of the transceiver(s) of the asynchronous RF network:

At the level of said A-GNSS server:
determining the time-of-day at which data proportional to said at least one time of arrival difference have been computed by said at least one node in function of the extracted time-stamp is also performed in function of said characteristic data about the asynchronous RF network.

According to an embodiment, with the A-GNSS server storing the up-to-date ephemeris of the satellites of the GNSS constellation and with extracting the time-stamp further comprising extracting said data proportional to said at least two time of arrival differences from said time-stamped data packet, the method further comprises:

At level of said A-GNSS server:
determining the geographic position of said at least one node device in function of at least the determined time-of-day and said data proportional to said at least two time of arrival differences.

According to an embodiment, the step consisting in extracting the time-stamp may further comprise at least one among:
extracting said data about the position of said at least one node device from said time-stamped data packet,
extracting said data about the position of said at least one transceiver from said time-stamped data packet, and
extracting said value of said determined delay from said time-stamped data packet.

It is another object of the invention to provide a system for providing assistance to geolocation of at least one node device of an asynchronous radio frequency (RF) network, preferably, a RF wide area network (WAN), preferably enabling long range communications, by implementing at least one transceiver, each of said at least one node device comprising a global positioning system (GNSS) receiver, and the asynchronous RF network being connected through at least one transceiver acting as a gateway to a backend network which houses an A-GNSS server, the system being designed for implementing a method for providing assistance to geolocation of said at least one node device, the method comprising the steps consisting in:

At the level of said GNSS receiver of said at least one node device:
receiving at least three GNSS signals from visible GNSS satellites,
computing data in function of, preferably proportional to, at least two time of arrival differences between receptions of predetermined signal sequences of said at least three GNSS signals taken in pairs;
generating a data packet comprising said data proportional to said at least two time of arrival differences, and
asynchronously emitting the data packet towards said at least one transceiver; and At the level of said at least one transceiver:
receiving said data packet,
adding a time-stamp to said data packet for generating a time-stamped data packet, and
emitting said time-stamped data packet toward a A-GNSS server;

At the level of said at least one transceiver acting as a gateway:

sending said time-stamped data packet to said A-GNSS server;

At level of said A-GNSS server:
receiving said time-stamped data packet,
extracting the time-stamp and said data proportional to said at least two time of arrival differences from said time-stamped data packet,
for at least one time of arrival difference, determining the time-of-day at which data proportional to said at least one time of arrival difference have been computed by said at least one node device in function of the extracted data among which at least the extracted time-stamp, and
determining the geographic position of said at least one node device in function of at least the determined time-of-day and said data proportional to said at least two time of arrival differences.

According to an embodiment, the backend network is a synchronous or a non-asynchronous RF network. It is a conventional network.

Further objects, features and advantages of the present invention will become apparent to the ones skilled in the art upon examination of the following description in reference to the accompanying drawings. It is intended that any additional advantages be incorporated herein.

The figures are given as example and are not restrictive to the invention.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

As discussed in the background section, assisted GNSS or A-GNSS is the standard solution that has been devised for expediting TTFF calculation of GNSS enabled devices connecting to a synchronous or non-asynchronous RF network like GSM, e.g. any of the recent so-called cellular "smart phones" that implement geolocation. Two modes of assistance have been defined which have in common to take advantage of the high-speed data communication channel offered by GSM networks and other synchronous or non-asynchronous RF networks like Wi-Fi, to reduce TIFF of an embedded GNSS receiver. More particularly, an assistance GNSS or A-GNSS server connected to each one of said synchronous or non-asynchronous RF networks is provided which regularly downloads GNSS orbital information like the up-to-date ephemeris or almanac of the GNSS satellites.

One of the two modes of assistance is referred to as mobile station (MS) based or MSB mode, also called mobile assisted GNSS. In MSB mode, the A-GNSS device embedded for instance in a GSM smartphone downloads a reference time and some up-to-date orbital information, such as the ephemeris and eventually the almanac of the GNSS satellites, from the A-GNSS server through said high-speed data communication channel. Since the data throughput of such communication channel is high, this downloading may require less than one second. The A-GNSS device also acquires data about its approximate location and eventually other optional assistance data, such as the frequency error of its internal oscillator. The downloaded reference time allows the A-GNSS device to correct its own time-of-day clock to know the precise time-of-day without error, or with an acceptable error regarding the need of the geolocation application. In function of the time-of-day and said data about its approximate location, the A-GNSS device can determine which satellites of the constellation are visible according to said almanac, then pick directly the satellites of the GNSS constellation that are visible at this time-of-day from its approximate position. In function of said frequency error of its internal oscillator, the A-GNSS device can reduce the frequency range that has to be explored for listening to the GNSS signals continuously sent by said visible satellites. With the help of the up-to-date ephemeris of the satellites of the GNSS constellation, the A-GNSS device can calculate its geolocation in function of GNSS signals received from the currently visible satellites.

The second mode is referred to as mobile station (MS) assisted or MSA mode, also called network assisted GNSS, where said mobile station is the A-GNSS device housing the GNSS receiver, e.g. a GSM smartphone. In MSA mode, the A-GNSS device digitizes the GNSS radio channel at a rate at least equal to the GNSS signal bandwidth and for a duration of at least a sequence length to at least 1 Msps ('sps' for samples per second) during at least 10 mSec, before transmitting the corresponding raw data to the A-GNSS server. In function of said raw data received from the A-GNSS device and provided that the A-GNSS server knows the approximate location of the A-GNSS device and the approximate time-of-day at which the samples of the GNSS signals were acquired by the A-GNSS device, the A-GNSS server can calculate the geolocation of the A-GNSS device and sends it back to the A-GNSS device. Hence, in MSA mode, the geolocation of the A-GNSS device is actually calculated by the A-GNSS server.

The advantage of this MSA mode is that it is potentially faster than the MSB mode since computing resources of the A-GNSS server may be greater than the ones of the A-GNSS device. The A-GNSS server may also take advantage of non-GNSS location data to expedite the calculation, or better locate the A-GNSS device. For example, if a database of all wireless access points with their geographic positions is made available to the A-GNSS server, this latter can take advantage of this non-GNSS information to help finding the A-GNSS device for instance by determining its approximate position. Similarly, the strength of the GSM signal issued from the A-GNSS device and received by some base stations can be exploited, provided the geographic positions of said base stations are known by the A-GNSS server.

Irrespective of which of the above modes is actually used, the mechanisms that have been devised to bring assistance to a GNSS receiver allow an A-GNSS device to provide its geolocation in, typically, less than three seconds in many cases. Unlike the standalone mode and the MSB mode, the MSA mode may also help an A-GNSS device to provide its position in indoor environment by using also non-GNSS information. Moreover, the mechanisms that have been devised to bring assistance to a GNSS receiver according to any one of MSB and MSA modes allow greatly reducing the consumption of the GNSS receiver simply because the time required to acquire its geolocation is drastically reduced.

On the contrary to synchronous or non-asynchronous RF networks, asynchronous RF network and more particularly a LPWAN do not offer high-speed data communication. Because wide communication ranges and low power are obtained at the expense of a low or very low data rate, downloading the needed orbital information from an A-GNSS server through a LPWAN takes too much time and becomes costlier than a standalone GNSS position acquisition, then is clearly not a solution. Moreover, downloading needed orbital information onto a node device from an A-GNSS server through an asynchronous RF WAN implies a significant power consumption incompatible with the use of battery-operated node devices intended to work over an extensive period of time without requiring any maintenance and replacement of their power sources; On the other hand, the use of the MSA mode requires the transfer of at least 20 kbits (at least 10 msec of raw signal samples sampled at ~1 Msps I/Q 1 bit). The typical bit rate of an LPWAN network being 100 bit/sec, this would require 200 sec which is again costlier than a stand-alone GNSS fix from cold-start. The use of any one of MSB and MSA modes cannot be considered as such to determine the geographic position of such node devices connected to an asynchronous RF network.

On the contrary to synchronous or non-asynchronous RF networks, asynchronous RF networks such as LPWAN do not require the allocation of a slot to allow communication between its components. Indeed, a non-asynchronous or synchronous communication requires the opening of a communication channel between a pair of components to allow communication between them. More particularly, in the framework of synchronous communication system, such as GSM communication system, a node device, i.e. a smartphone, has to wait for the allocation of a slot by a base station to communicate with it. This waiting time renders non-deterministic the time at which a data packet may be efficiently communicated from a node device to a base station.

Figure 2:
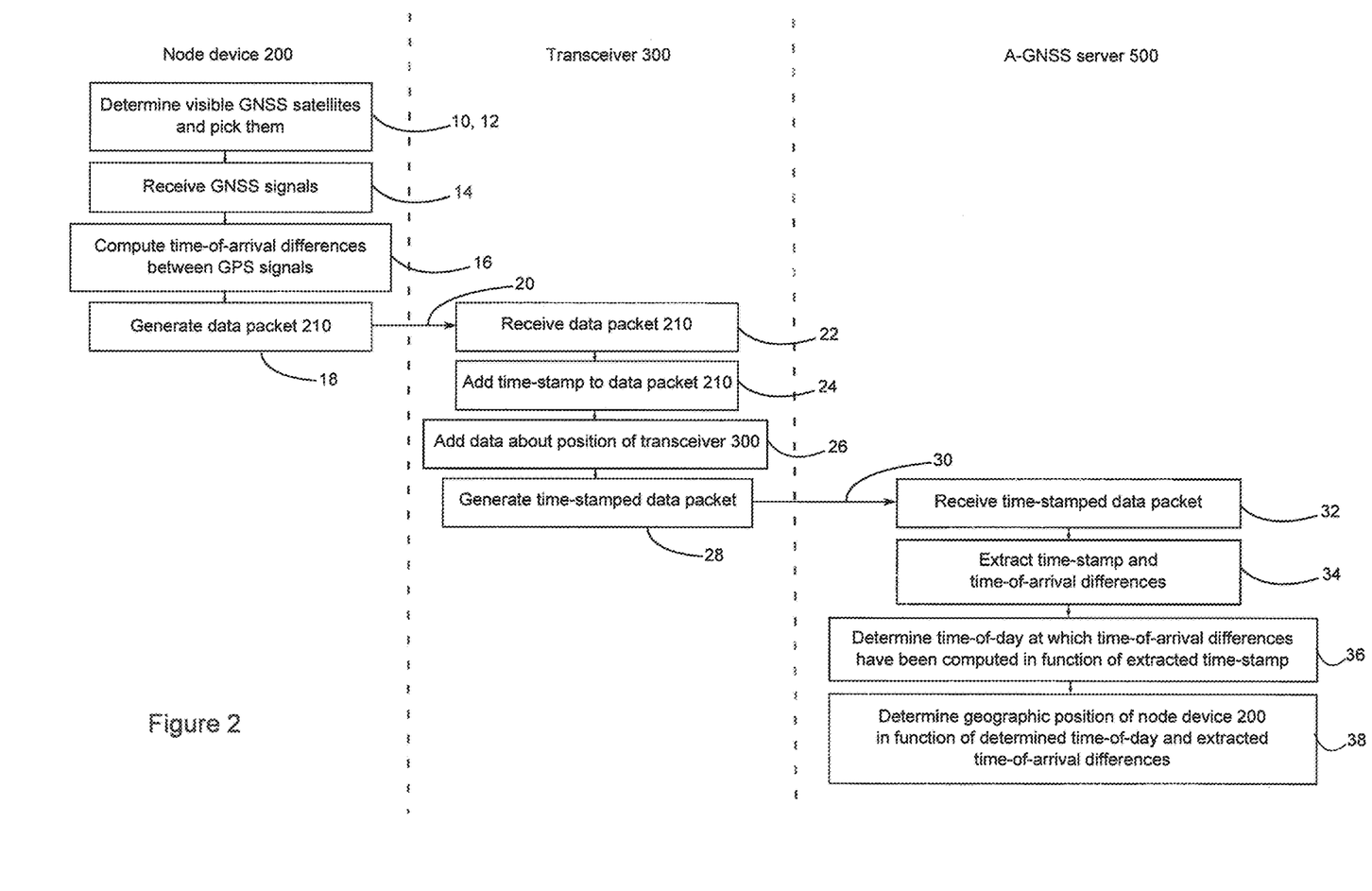
FIG. 2 is a flowchart schematically showing steps of the method according to an embodiment of the invention.

With reference to FIG. 2, since asynchronous RF networks such as LPWAN do not require the allocation of a slot to allow communication between its components, the time-of-day at which data are sent 20 notably from each node device 200 of such an asynchronous network is known in a deterministic manner. Moreover, the propagation time needed to transmit said data notably from each node device 200 to at least one transceiver 300 of said asynchronous RF network may also be known in a deterministic manner. This propagation time may be neglected or not with regard to geolocation application of at least one node device 200. Each node device 200 may send 20*a* data packet 210 towards at least one transceiver 300 of said asynchronous RF network promptly or with a determined delay after the generation 18 of said data packet 210. The time spent for generating 18 said data packet 210 may also be known in a deterministic manner in function of processing capabilities of at least one among the micro-controller of the node device 200 and its GNSS receiver.

Thus, in the framework of asynchronous RF networks, provided the precise time-of-day at which at least one transceiver 300 received 22 a data packet 210 issued from a node device 200, the precise time-of-day at which said node device 200 sent 20 said data packet 210 may be computed. In the same way, provided the precise time needed for the generation 18 of said data packet 210 by the node device 200 or its GNSS receiver, the precise time-of-day at which said node device 200 received 14 data in function of which said data packet 210 have been generated 18 may be computed. The invention fully takes advantage of this particular technical feature of asynchronous RF networks over synchronous RF networks.

Figure 1:
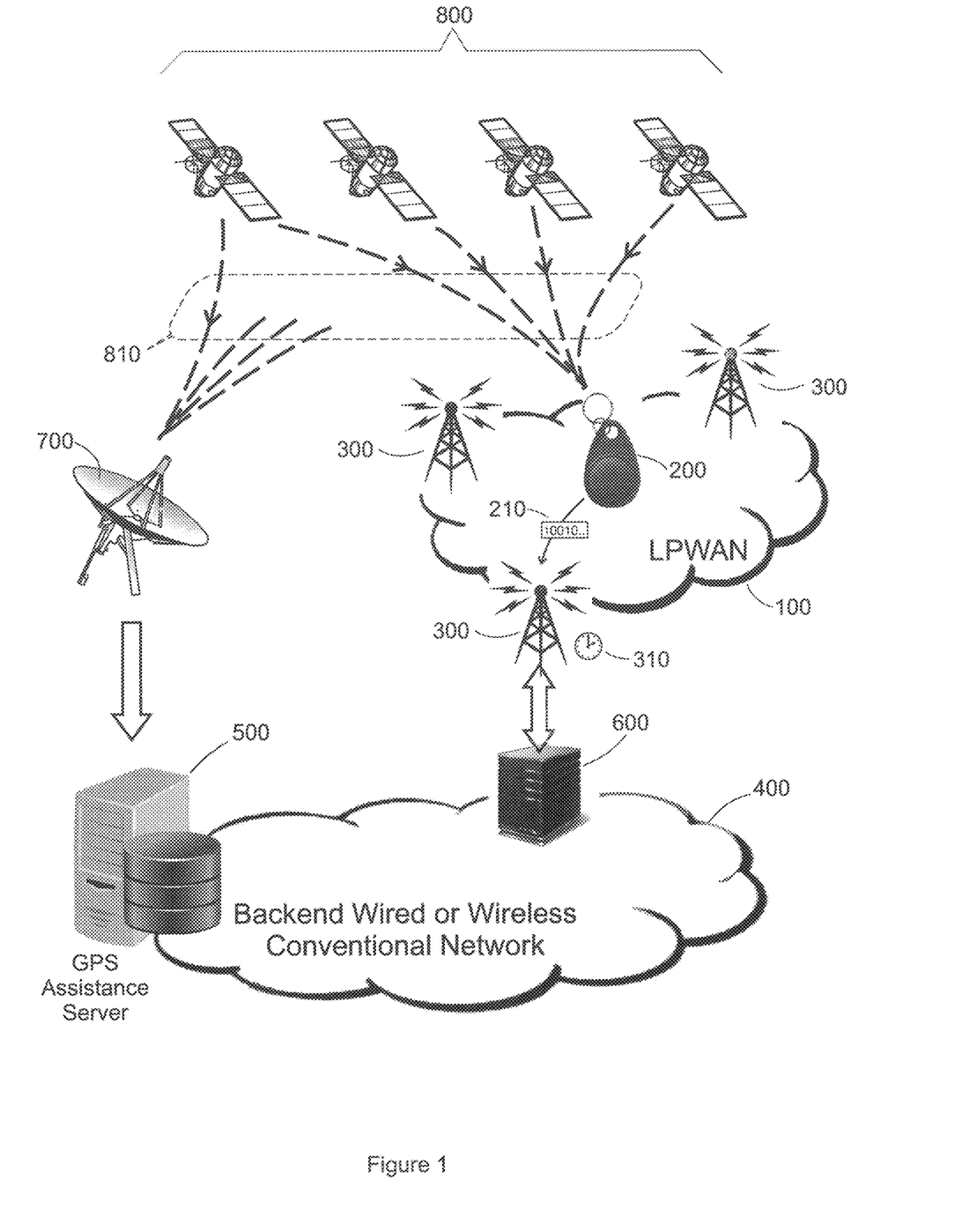
FIG. 1 shows schematically a communication system in which an embodiment of the invention may be implemented.

With reference to FIG. 1, the present invention is concerned by a method for providing assistance to geolocation of at least one node device 200 of an asynchronous RF network 100.

Said asynchronous RF network 100 may be designed to enable communications, for instance long range communications, by implementing at least one transceiver 300, through which the node device 200 is connected to said asynchronous RF network 100. Potentially, a large number of node devices 200 is implemented into said asynchronous RF network 100. Each node device 200 may obviously be mobile or tied to something potentially in movement.

According to one embodiment, the asynchronous RF network 100 is a Wide Area Network (WAN).

According to one embodiment, the asynchronous RF network 100 is a low-power WAN (LPWAN). Said LPWAN may have a data throughput which does not exceed a few hundreds of bits per second (bps), for instance 1000 bps, and may be as low as a few tenths of bps, for instance 50 bps.

According to another embodiment, the asynchronous RF network 100 has to be designed to allow achieving low power consumption of implemented node devices 200 and then allows the implementation of battery-operated node devices intended to work over an extensive period without requiring any maintenance and replacement of their power sources.

According to another embodiment, the asynchronous RF network 100 is a low-power WAN (LPWAN) designed to allow achieving low power consumption of implemented node devices 200.

The asynchronous RF network 100 is particular in that it allows asynchronous communication between its components 200, 300 and notably from each node device 200 to at least one transceiver 300 with which it is able to communicate over the asynchronous RF network 100.

This is thus a particular technical feature of the asynchronous RF networks to allow communication between each pair of its components 200, 300 at a deterministic time-of-day. More particularly, the asynchronous RF network allows a node device 200 to emit a data packet 210 at a deterministic time after receiving 14 the signal sequences of at least three GNSS signals. Then it is possible to deduce the precise time at which said signal sequences have been received 14 from the precise time at which the data packet 210 is emitted by the node device 200 or received by the other components 300 of the asynchronous RF network 100.

FIG. 1 shows schematically an embodiment of a communication system in which the method 1 according to the invention may be operated. Said communication system comprises the asynchronous RF network 100 illustrated as a LPWAN. It implements at least one node device 200 and at least one transceiver 300. Each node device 200 is capable of communicating with at least one transceiver 300 provided there is not a too large distance between them. The span of the asynchronous RF network 100 is defined by the geographic distribution of the transceivers 300 and potentially their emitting power. Taking into account their emitting power, the transceivers 300 are preferably geographically distributed in order for the RF span of the asynchronous RF network 100 to fully cover a wide area. Each of said transceivers 300 is preferably located so as to be able to receive data packets from at least a set of node devices 200. Each of said transceivers 300 is designed for emitting to at least 10 km Line Of Sight range, or to approximately 300 m in urban environment.

Each node device 200 may comprise a global positioning system (GNSS) receiver. Each node device 200 is able, owing to its GNSS receiver, to receive 14 GNSS signals 810 emitted by satellites 800 of the GNSS constellation which are visible to it. Satellites located at the opposite side of the earth with respect to the geographic position of a node device 200 are considered to be not visible to said node device 200. According to common knowledge in the technical field of GNSS, the data received 14 at each node device 200 to be tracked may include data identifying a respective associated satellite by, for example, a satellite identification number, such that the step of calculating the location of the node device 200 to be tracked is based further upon the satellite identification numbers. Thus the data packet data packet 210 issued from the node device 200 may comprise said satellite identification numbers in order for the satellites from which GNSS signals was received to be identified.

The communication system may also comprise an assistance GNSS or A-GNSS server 500. This latter is made capable of receiving GNSS signals 810 through a dedicated antenna and equipment 700 from a plurality of GNSS satellites 800 or has access to a server serving equivalent data in real time so that it can download all large pieces of information necessary to the implementation of GNSS. Such large pieces of information may comprise orbital information about the satellites 800 of the GNSS constellation, like the ephemeris of satellites or the almanac of the GNSS constellation.

The A-GNSS server 500 is part of a backend wired or wireless high-throughput network 400. This backend network 400 may be defined as standard or conventional for emphasizing that it may be a synchronous or non-asynchronous network.

The asynchronous RF network 100 is connected through at least one transceiver 300 acting as a gateway to the backend network 400 which houses the A-GNSS server 500. Each transceiver 300 acting as a gateway may be connected to the backend network 400 through any conventional wired or wireless communications and/or computerized equipment 600, without prejudice to the implementation of the method 1 for providing assistance according to the invention. Each transceiver 300 may be connected by wire connection to the backend network 400. When such a wire connection between a transceiver 300 of the asynchronous RF network 100 and the backend network 400 does not exist, said transceiver may be designed to communicate with at least one another transceiver of the asynchronous RF network 100 by RF signal(s), so that said at least one another transceiver 300 can transmit data received from the wireless transceiver 300 to the backend network 400. In the framework of the present method 1, the time spent to wirelessly transmit data from said wireless transceiver 300 to said at least one another transceiver 300 may be neglected or computed to be taken into account. If we want to transmit the data packet 210 from one transceiver 300 to another transceiver, until achieving the transceiver acting as a gateway, it is sufficient to add, into the data packet 210 from a nth transceiver to a nth+1 transceiver, a field that comprises at least one among:

i. the duration, for instance in mSec, of the transmission of the data packet 210 from the nth transceiver to the nth+1 transceiver, this duration depending on the RF signal propagation speed and the distance between the nth transceiver and the nth+1 transceiver,
  ii. a time-stamp for time-stamping the precise time-of-day at which the nth transceiver receives the data packet and/or a time-stamp for time-stamping the precise time-of-day at which the nth+1 transceiver receives the data packet, and iii. the duration since computation of data comprised into said data packet.

We may even add a random delay between multiple transmissions of the same data packet 210 between transceivers 300 of the asynchronous RF network 100 to prevent effects of systematic collisions between transmissions issued from different node devices 200.

The above mentioned embodiment wherein said transceiver may be designed to communicate with at least one another transceiver of the asynchronous RF network 100 also applies to transceiver that are connected through wires.

Alternatively, said A-GNSS server may store a map of the geographic positions of the transceivers of the asynchronous RF network 100; thus, providing said A-GNSS server knows the transceiver(s) 300 through which the RF signal(s) were transferred, it can compute the time spent for the transfer(s).

Said at least one node device 200 and/or its GNSS receiver may comprise a real time clock (RTC) for knowing the time-of-day. Advantageously, for keeping the cost of node devices 200 as low as possible, a RTC with a low-cost 32 kilohertz watch crystal may be used. A precision of +/−1 second of such a RTC may be maintained on a daily basis by resetting it at regular intervals with help of time messages received through the asynchronous RF network 100. Thus said RTC allows knowing the time-of-day with an accuracy of only plus or minus one second.

Each transceiver 300 is equipped with a Real Time Clock (RTC) having accuracy better than or equal to one millisecond, for instance equal to +/−8 μsec, to know precisely the time-of-day. Transceivers 300 may actually be equipped with GNSS receivers to keep their clocks accurate.

The method 1 for providing assistance to at least one node device 200 of an asynchronous RF network, for instance an asynchronous RF WAN, implementing at least one transceiver 300, each of said at least one node device 200 comprising a GNSS receiver, is described below with reference to the appended FIG. 2.

The GNSS receiver comprised by each node device 200 is able to receive 14 GNSS signals from visible satellites and to quickly discriminate a signal sequence into each GNSS signal. This signal sequence may be any kind of sequence recognizable by said GNSS receiver; said signal sequence being repeated periodically, into said GNSS signal. Signal sequences of different GNSS signals are synchronously issued by satellites. Each signal sequence may be a so-called pseudo-random sequence (PRS) which is different for each satellite and corresponds to its signature. For instance, each signal sequence may be emitted periodically, more than every 10 milliseconds, preferably every millisecond.

The GNSS receiver of each of said at least one node 200 is further designed to compute 16 data proportional to at least two time of arrival differences between at least three signal sequences received from at least three satellites. The GNSS receiver and/or the micro-controller of the node device 200 may be designed for measuring said data proportional to said at least two time of arrival differences in less than one second.

Each time of arrival difference is more particularly measured modulo the period of repetition of said signal sequence, provided that each GNSS signal repeats said signal sequence according to the same period. Thus, for the GPS constellation the time of arrival difference can be known only modulo a period, for instance a period of one millisecond (that to say exactly 1023 μSec).

Further, said at least one node device 200 and/or its GNSS receiver may comprise a non-transitory computer readable medium notably for storing at least data about its position with an accuracy of less than three hundred kilometers, preferably less than one hundred kilometers. Thereafter, said data may also be called "data about the approximate position of said at least one node device 200". Depending on the application made of node devices 200, their position(s) may indeed be known within the above specified ranges. For instance, node devices 200 may be secured on bikes to be rent in a given town; thus the approximate position of each node device 200 is intended to be into this town or its suburb. As discussed latter, if said at least one node device 200 and/or its GNSS receiver had no knowledge about its approximate position when it waked up, this information would potentially be advised by said at least one transceiver 300, since the emitting range of said at least one node device 200 is less than 100 km, for instance of approximately 10 km. Then the simple fact of receiving 22 a data packet 210 from a node device 200 at the level of a first transceiver 300 is sufficient to know the position of said node device 200 within an area of approximately 10 km around said first transceiver 300.

The non-transitory computer readable medium of each node device 200 or its GNSS receiver may store, further to its approximate position, at least an almanac of a GNSS constellation of satellites. Then it may determine 10 which satellites of the GNSS constellation are visible according to said almanac in function of said data about its approximate position and the time-of-day given by its RTC. Thus said at least one node device 200 or its GNSS receiver may pick 12 said at least three visible satellites of the GNSS constellation to listen for said at least three GNSS signals. Moreover, for each satellite, said at least one node device 200 or its GNSS receiver may also calculate a prediction of the expected frequency offset due to the Doppler Effect. Indeed, when the node device 200 knows its approximate position and stores an almanac of the GNSS satellites, it can compute the approximate position of the GNSS satellites and then it can know if a GNSS satellite is getting closer to or away from it, and then the frequency offset it has to expect from the GNSS signal of this GNSS satellite.

With regard to this Doppler Effect, a more particular case which is specific to a GNSS receiver capable of listening to a beacon of the asynchronous RF network 100 is described below.

The period of time (and therefore the energy consumption) that a GNSS receiver requires to acquire 3 or 4 desired signal sequences depends on the size of the frequency search space.

For each satellite, the number of Operations to be performed to acquire its GNSS signal is proportional to $F_{error} \times T_{integ}^2$ where $F_{error}$ is the maximum error of estimating the frequency at which the GNSS receiver searches the GNSS signal and $T_{integ}$ is the desired time of coherent integration, this desired time being at the least of 1 mSec (corresponding to a length unity of the GNSS signal) and at the most of 20 mSec (corresponding to 20 times a length unity of the GNSS signal).

The maximum error of estimating the frequency $F_{error}$ arises from three sources:

1. the error on the frequency of the GNSS receiver oscillator serving as a frequency reference; for example, if the frequency of the oscillator is known with an accuracy of +/−30 ppm (typical value), then the GNSS receiver may make an error of +/−47 kHz (30 ppm*1,575 Ghz) on the frequency at which it expects the GNSS signal;

2. the error on the estimation of the satellite Doppler; when a satellite is rising on the horizon, its GNSS signal is received with a slightly higher frequency (about +4,2 kHz)

comparing to the frequency of emitted GNSS signal because the satellite approaches the GNSS receiver, Doppler error on the GNSS signal for a satellite having reached the zenith is zero, and when the satellite is setting on the horizon, its GNSS signal is received with a slightly lesser frequency (about −4,2 kHz) comparing to the frequency of emitted GNSS signal because the satellite gets away from the GNSS receiver.

3. the error due to the speed of the GNSS receiver which also creates a Doppler Effect; this error is of 468 Hz for a speed of 160 km/h of the GNSS receiver.

Thus a GNSS receiver without any assistance should sweep the interval of possible frequencies defined between 1,575 Ghz +/−52 kHz with $0,5/T_{integ}$ (that is to say: 500 Hz, when $T_{integ}$=1 mSec, which corresponds to the lower sensitivity, and 25 Hz when $T_{integ}$=20 mSec which corresponds to the best sensitivity).

To accelerate the acquisition of each GNSS signal and thus to reduce the energy consumption of each node device, frequency search interval should be as small as possible.

Two ways are described below to achieve this objective.

The first way uses the benefit of a technical feature of some of the LPWAN (for example using the LoRa modulation technology) which periodically broadcasts a "beacon" signal, which serves to synchronize the node devices 200. This beacon signal can be very easily received with a very low energy cost. When the device's LPWAN radio receiver receives this beacon signal, it is typically able to estimate the frequency of its oscillator with an accuracy of +/−0.2 ppm, to be compared with an uncalibrated crystal the oscillator frequency uncertainty of which is about +/−30 ppm. The search space is thus reduced to +/−315 Hz instead of +/−47 kHz.

The second way consists in the fact that the GNSS receiver can calculate the Doppler induced frequency offset of a satellite when he knows the following elements:
The satellite trajectory (given by the almanac),
Its approximate location, and
The roughly estimated time.

For instance, the error on the estimated Doppler Effect, when the GNSS receiver is located 3 km from its actual position, is of +/−3 Hz; the error on the estimated Doppler Effect when the GNSS receiver is mistaken by 2 sec from the real time-of-day, is of +/−1.6 Hz.

The beacon signal of LPWAN may comprise the GNSS coordinates of the nearest transceiver, as well as the current GNSS time. So, if the GNSS receiver has an almanac and receives the beacon signal, it knows all data needed to estimate very precisely the Doppler Effect of each satellite. In this case, the calibration error of the oscillator frequency and its own Doppler Effect error (due to the movement speed of the GNSS receiver, not foreseeable) are dominant.

To conclude, when the GNSS receiver has an up-to-date almanac, by using the beacon signal of the LPWAN, it can:
measure the oscillator frequency error with an accuracy of +/−0.2 ppm,
determine its approximate position with an accuracy of about +/−5 km,
know the time-of-day with an accuracy of +/−1 sec.

So the size of the frequency range to be swept is reduced form +/−52 kHz to +/−783 Hz (468 kHz+315 kHz). Thus the number of operations needed to acquire a GNSS signal is divided by one hundred, without requiring a downlink specific to a given node device 200, since the beacon signal is broadcasted indifferently by the LPWAN to all node devices 200.

After computation 16 of said at least two time of arrival differences between the signal sequences received from said at least three satellites, said at least one node device 200 or its GNSS receiver generates 18 and asynchronously emits 20 a data packet 210 carrying said at least two time of arrival differences through the asynchronous RF network 100 towards said at least one transceiver 300. Said data packet 210 may also carry the approximate position of said at least one node device 200. Said data packet 210 may be properly compressed and encoded so as to reduce the amount of data to be transported on the asynchronous RF network 100 which may notably be a low throughput LPWAN.

Said at least one transceiver 300 receives 22 said data packet 210 and adds 24 a time-stamp to said data packet 210 for generating 28 a time-stamped data packet comprising at least the computed time of arrival differences and said time-stamp.

When said data packet 210 further carries information about the approximate position of the node device 200 from which the received data packet 210 was issued, the time-stamped data packet may also comprise said information. Alternatively, said at least one transceiver 300 can also add 26 to said data packet 210 an information about its own geographic position, further to said time-stamp; with this added information being intended to define the approximate position of said at least one node device 200 provided the distance between said node device 200 and said transceiver 300 is less than one hundred kilometers (that is commonly the case taking into consideration the emitting power of said node device 200).

The time-stamp added by said at least one transceiver 300 to the data packet 210 is determined with an accuracy of plus or minus 1 millisecond, preferably plus or minus 8 microseconds according to its RTC. Indeed, each transceiver 300 is equipped with a RTC having a much better accuracy and stability than the ones of node devices 200.

As described above, the asynchronous RF network 100 is connected through said at least one transceiver 300 acting as a gateway to the backend network 400 which houses the A-GNSS server 500. Thus said at least one transceiver 300 acting as a gateway is able to emit 30a and/or send 30b said time-stamped data packet towards and/or to said A-GNSS server 500, respectively.

Said A-GNSS server 500 receives 32 said time-stamped data packet and extracts 34 the time-stamp from said time-stamped data packet. Then said A-GNSS server 500 is able to determine 36, for at least one computed time of arrival difference or for each computed time of arrival difference, the time-of-day at which the time of arrival difference has been computed by said at least one node device 200 in function of the extracted time-stamp.

For geolocation purposes, the A-GNSS server 500 has to know precisely when each time of arrival difference has been computed to be able to compute precisely the position of each of the concerned satellite at this instant. Because satellites are moving at a speed of about 800 meters per second (m/sec) with respect to ground, an error of 10 milliseconds on the time-of-day when said signal sequences were acquired or equivalently when the time of arrival difference were computed results in an error of 8 meters on the geographic position; this value of 10 milliseconds is generally considered has an upper limit to not exceed.

By exploiting the particular technical feature of the asynchronous RF network 100 according to which it allows communication between each pair of its components 200, 300 at a deterministic time-of-day, the A-GNSS server 500 is able to determine 36 the time-of-day when the time of arrival difference(s) were computed by said at least one node 200 with an accuracy proportional to the accuracy of the clock of said at least one transceiver 300 owing to the time-stamp added to the data packet 210, that is an accuracy enabling the geolocation of the node device 200 with an acceptable error.

Said A-GNSS server 500 may also extract 34 each computed time of arrival difference from said time-stamped data packet.

Then, the A-GNSS server 500 storing the up-to-date ephemeris of the satellites of the GNSS constellation, may determine 38 the geographic position of the node device 200 in function of at least the determined time-of-day and said data proportional to said at least two time of arrival differences. For instance, the A-GNSS server 500 determines the geographic positions of said at least three satellites in function of the determined time-of-day(s); then the A-GNSS server 500 determines the geographic position of the node device 200 in function of the determined positions of said at least three satellites at the determined time-of-day(s).

In good approximation, compatible with geolocation purposes of said at least one node device 200, said at least three GNSS signals may have been received by said at least one node device at the same instant. Thus the determined time-of-day when at least one time of arrival difference was computed by said at least one node 200 may be considered to be equal (exactly or in good approximation) to the time-of-day(s) when other time of arrival differences were computed by said at least one node 200. Alternatively, the A-GNSS server 500 is able to determine 36, for each computed time of arrival difference, the time-of-day at which this time of arrival difference has been computed by said at least one node device 200 in function of the extracted time-stamp, then to determine 38 the geographic position of the node device 200 in function of the determined time-of-days and said data proportional to said at least two time of arrival differences.

Three satellite signals allow achieving the (X, Y) position of the node device 100. Thus, in the event the node device 200 is known to be into an area of a known altitude or as a function of an elevation map or by using the last known altitude of the node device, or by using measurement of a pressure sensor (altimeter) embedded in the node device, the A-GNSS server 500 is able to determine 38 with said at least two time of arrival differences the geolocation of the node device 200 which computed and transmitted to it said at least two time of arrival differences.

In the event the altitude of said node device 200 is unknown and/or in order to strengthen the method 1, four or more GNSS signals from visible GNSS satellites 800 may be received 14 by the node device 200, then at least three time of arrival differences between receptions of predetermined signal sequences of said four or more GNSS signals taken in pairs may be computed 16 by the node device 200, in order for the data packet 210 to comprise said at least three time of arrival differences. Thus, the A-GNSS server 500 is able to determine 38, in function of at least three time of arrival differences, the geolocation (X, Y, Z) of the node device 200 which computed and transmitted to it said at least three time of arrival differences, even if the altitude of said node device 200 cannot be predetermined.

The A-GNSS server 500 may have to further cope with the following problem. Getting the time of arrival differences modulo 1 millisecond has for consequence that the GNSS position equations may have multiple remote solutions 300 km away of each other.

The above problem may then be removed by knowing the approximate position of the node device 200 that forwarded the data packet 210 carrying said at least two time of arrival differences. This information may either be comprised into the time-stamped data packet received by the A-GNSS server 500, either already known by the A-GNSS server 500. On the one hand, as described above, the data packet 210 may comprise information about the approximate position of said node device 200 or this information may have been added to said data packet 210 by said at least one transceiver 300, so that the A-GNSS server 500 simply has to extract 34 this information from the time-stamped data packet. Alternatively, the A-GNSS server 500 may already know or be able to acquire this information because, according to the geolocation application it is working for, all node devices 200 are known to be located in a same area such as a town or a natural reserve.

Thus, where each node device 200 is assumed to know the time-of-day with an accuracy of only plus or minus 1 second (that is an insufficient accuracy for geolocation purposes), the geolocation of said node device 200 is determined by the A-GNSS server 500 by help of the time-stamp known with an accuracy better than or equal to 10 milliseconds and advised by said at least one transceiver 300 of the asynchronous RF network 100. The technical feature of said asynchronous RF network 100 according to which the time-of-day at which data are sent from each node device 200 is known in a deterministic manner thus allows the A-GNSS server 500 to determine retrospectively this time-of-day in function of the time-stamp added by said at least one transceiver 300 on the propagation way of a data packet 210 issued from said node device 200 over the asynchronous RF network 100.

The node devices 200 of the asynchronous RF network 100 do not need to download the large pieces of GNSS data like the ephemeris in order, as already discussed, to keep them active for a minimum amount of time so as to reduce their power consumption as much as possible and keep them working for the longest possible period of time.

In an environment as depicted in FIG. 1, the invention allows a node device 200 making part of the LPWAN 100, to operate an embedded A-GNSS receiver for geolocation purposes in spite of the fact that the throughput of such a LPWAN is not sufficient for the standard assistance modes, referred to as MSA and MSB, that have been described above and which both assume that the network on which the GNSS assistance is provided have a sufficient throughput to expedite the exchange of large pieces of data.

Because the A-GNSS server 500 may be made aware of the fixed transportation delay through the asynchronous RF network 100, it can precisely determine at which time satellite signal sequences were acquired and compared to get time of arrival differences and from where the precise geographic position of the node device 200 is inferred.

As mentioned above, data packets 210 may be emitted 20 towards said at least one transceiver 300 without delay, or with a predetermined delay, after the useful information, e.g. the computed time of arrival differences, has been acquired. Sending data packets 210 with a determined delay may allow to tackle the problem of collisions occurring between RF signals emitted 20 from node devices 200 which possibly wake up and emit 20 data packets 210 simultaneously; in order to achieve this, a value of said predetermined delay may then be carried by the data packet 210 so that the A-GNSS server 500 knows it and can still determine the precise time-of-day of computation of time of arrival differences. Moreover, said determined delay may be randomly generated by said at least one node device 200.

More particularly, asynchronously emitting 20 the data packet 210 from said at least one node device 200 may be performed repeatedly, for instance according to a determined number of times. Each broadcast 20 of a data packet 210 from one node device 200 may also be performed after a randomly determined delay. This way, in the event a first attempt to efficiently send 20 a data packet 210 to one transceiver 300 fails, for instance because of the collision between said data packet 210 and another one sent by another node device 200, a second attempt and potentially a determined number of attempts may be implemented to be sure that at least one attempt allows eventually to determine 38 the geolocation of the node device 200.

More than one transceiver 300 may receive 22 a same data packet 210 from a single node device 200, for instance providing said node device is connected to two or more transceivers 300. Then more than one broadcast 30a of a time-stamped data packet intended to allow determining the geolocation of said single node device 200 may be performed. Then the A-GNSS server may have to compute twice or more the geolocation of said single node device 200. In order to avoid such unnecessary computations, an identifier of said node device 200 may be added to the data packet 210, and then carries by the corresponding time-stamped data packet, to be eventually used by the A-GNSS server to realize that two or more geolocation requests it receives 32 came from the same node device 200.

A specific embodiment of the present invention is described below which may comprise several of the above described technical considerations and several added technical considerations. This specific embodiment and notably said added technical considerations should not be considered as limiting the scope of the protection sought according to the appended claims.

According to said specific embodiment, the method 1 for providing assistance to geolocation of at least one node device 200 of an asynchronous RF network 100 by implementing at least one transceiver 300, each of said at least one node device 200 comprising a GNSS receiver, comprises the following steps:
1. Said at least one node device 200 acquires at least three pseudo-random sequences; said at least one node device 200 wakes up at an arbitrary moment and searches for its precise geographic position; it wakes up its GNSS receiver to find at least the pseudo-random sequences issued from at least three satellites; In this research phase of the GNSS receiver may be completely unassisted (i.e. without knowledge of any kind of information about the satellite signals to seek for and without knowledge of any frequency error to be expected) or otherwise assisted (the GNSS receiver has knowledge of its approximate location (+/−100 km), the approximate time (+/−1 min) and stores an almanac (of less than 3 months); in this assisted case, it can determine the satellites theoretically visible to it and calculate their Doppler frequency offset so as to accelerate the research pseudo-random sequences of satellites.
2. Once the GNSS receiver of said at least one node device 200 has acquired at least three pseudo-random sequences, said at least one node device 200 broadcasts on the asynchronous RF network at least one radio signal containing the following information:
   a. Its unique identifier (such as a network address),
   b. the delay De (in mSec) since the acquisition of said at least three pseudo-random sequences,
   c. A list of the N identifiers (SVid1,2, . . . n) of the satellites acquired, and
   d. A list of (N-1) time of arrival differences [T2, T3, . . . , Tn], with Tn being the difference between the times of arrival of the sequences transmitted by the satellites SVn and SV1.
3. Said at least one radio signal is received by said at least one transceiver 300 of the asynchronous RF network 100 where its frame(s) is(are) time-stamped (with Tmst being the time-stamped time), and also where a field comprising information about the reception power of said at least one radio signal (Rssi) is added to its frame(s); the propagation delay in air of said frame(s) may be negligible for geolocation purposes (because it represents only a few microseconds). Said at least one transceiver 300 forwards the modified version of said at least one radio signal toward an A-GNSS server.
4. The A-GNSS server makes a first coarse estimate of the position (with a precision of less than 30 km) of said at least one node device 200 in function of said information about the reception power of all radio signal frames received from said at least one node device 200; then, in function of the Tmst fields and the delay contained in the payload of said at least one radio signal, the A-GNSS server estimates the acquisition time at which the pseudo-ranges PR were acquired (this acquisition time Taq being equal to the time-stamped time Tmst minus the delay De) with an accuracy of about 1 mSec.
5. The A-GNSS server already stores or acquires the up-to-date ephemeris of all satellites; from these ephemeris, the A-GNSS server calculates the position Ps(i) of each of the said at least three satellites at the acquisition time Taq of their pseudo-ranges PR, where Ps(i) is the position [x, y, z] of the satellite i at time Taq.
6. The A-GNSS server solves the system of equations:

$$\text{distance } (Ps(i), C) - \text{distance}(Ps(1), C) = (T_i \text{ modulo } 1 \text{ ms}) \cdot C_{light}$$

For each i>1,
Where C is the position of the node device 200 to be localized and Clight is the speed of light. For instance, when the radio signal contains 3 time-of-arrival differences related to 4 satellites (1,2,3,4), the system of equations to be solved is:

$$\begin{bmatrix} \text{distance}(Ps(2), C) - \text{distance}(Ps(1), C) = (T_2 \text{ modulo } 1 \text{ ms}) \cdot C_{light} \\ \text{distance}(Ps(3), C) - \text{distance}(Ps(1), C) = (T_2 \text{ modulo } 1 \text{ ms}) \cdot C_{light} \\ \text{distance}(Ps(4), C) - \text{distance}(Ps(1), C) = (T_2 \text{ modulo } 1 \text{ ms}) \cdot C_{light} \end{bmatrix}$$

Which comprises 3 unknown parameters (x, y, z).
In the event only three satellites are visible, the altitude of said at least one node device 200 must be set to remove an unknown. In this case, the unknown parameters become: x for instance for the latitude, y for instance for the longitude. If there are more visible satellites that unknown parameters (that is to say more than four satellites) then the system of equations may be solved in order to minimize the error.
The system of equations can have multiple remote solutions spaced apart from each other from about 300 km because of the modulo in the equations. This is why the A-GNSS server should roughly determine the position of the tag by another method (e.g. by acquiring the knowledge of said reception power of said at least one radio signal (Rssi) to the antenna of said at least one transceiver 300, or by the knowledge of the application said at least one node device 200 is intended for, for instance because said at least one node device 200 is in a bounded geographical area.

7. The server communicates the user to said at least one node device 200 the calculated precise position and the time at which the position was acquired Taq.

In the present invention, the global navigation satellite system (GNSS) can be any one of the GNSS. For instance the GNSS can be the global positioning system (GPS) or GALILEO or BEIDOU or IRNSS or QZSS.

The invention is not limited to the embodiments described above and extends to all the embodiments covered by the claims.

What is claimed is:

1. Method for providing assistance to geolocation of at least one node device of an asynchronous radio frequency (RF) network by implementing at least one transceiver, each of said at least one node device comprising a global navigation satellite system (GNSS) receiver, the method comprising the following steps:
at the level of said GNSS receiver of said at least one node device:
receiving at least three GNSS signals from visible GNSS satellites;
computing data proportional to at least two time of arrival differences between receptions of predetermined signal sequences of said at least three GNSS signals taken in pairs;
generating a data packet comprising said data proportional to said at least two time of arrival differences, and
asynchronously emitting the data packet towards said at least one transceiver; and
at the level of said at least one transceiver:
receiving said data packet,
adding a time-stamp to said data packet for generating a time-stamped data packet; and
emitting said time-stamped data packet toward a A-GNSS server.

2. Method according to claim 1, wherein the time-stamp is determined with an accuracy of plus or minus 1 millisecond, preferably plus or minus 8 microseconds.

3. Method according to claim 1, wherein, said at least one node device comprises a non-transitory computer readable medium for storing at least data about its position with an accuracy of less than three hundreds kilometers, preferably less than one hundred kilometers, said data packet further carries said data about the approximate position of said at least one node.

4. Method according to claim 1, wherein, said at least one node device comprises a real time clock (RTC) for knowing the time-of-day with an accuracy of plus or minus one second and a non-transitory computer readable medium for storing at least an almanac of a GNSS constellation of satellites and data about its position with an accuracy of less than three hundreds kilometers, preferably less than one hundred kilometers, the method further comprises:
at the level of said GNSS receiver of said at least one node device:
determining which satellites of the GNSS constellation are visible according to said almanac in function of said data about the approximate position of said at least one node device and the time-of-day given by the RTC of said at least one node device, and picking at least three visible satellites of the GNSS constellation to listen for said at least three GNSS signals.

5. Method according to claim 1, further comprising, with said at least one transceiver comprising a non-transitory computer readable medium for storing data about its position:
at the level of said at least one transceiver:
adding data about the position of said at least one transceiver, in addition to the time-stamp, for generating the time-stamped data packet.

6. Method according to claim 1, wherein each signal sequence is emitted periodically with a period inferior to 10 milliseconds, preferably equal to 1 millisecond.

7. Method according to claim 1, wherein the asynchronous RF network is a low-power wide area network (LP-WAN), the throughput of which does not exceed 1000 bits per second (bps) and may be as low as 50 bps.

8. Method according to claim 1, wherein asynchronously emitting the data packet issued from said at least one node device is performed after a determined delay, said data packet further carrying a value of said determined delay, said determined delay being potentially randomly generated by said at least one node device, and preferably wherein asynchronously emitting the data packet issued from said at least one node device is performed repeatedly, for instance according to a determined number of times.

9. Method according to claim 1, wherein said at least one node device comprises at least one battery-operated node device intended to work over an extensive period of time without requiring any maintenance and replacement of their power sources.

10. The method according to claim 1, wherein, the asynchronous RF network being connected through at least one transceiver acting as a gateway to a backend network which houses an A-GNSS server, the method further comprises:
At the level of said at least one transceiver acting as a gateway:
sending said time-stamped data packet to said A-GNSS server,
At level of said A-GNSS server:
receiving said time-stamped data packet,
extracting the time-stamp and said data proportional to said at least two time of arrival differences from said time-stamped data packet, and
for at least one time of arrival difference, determining the time-of-day at which data proportional to the time of arrival difference have been computed by said at least one node in function of the extracted data among which at least the extracted time-stamp.

11. The method according to claim 10, wherein, with the A-GNSS server storing characteristic data about the asynchronous RF network, said characteristic data comprising at least one among a deterministic time of arrival through the asynchronous RF network to said at least one transceiver acting as a gateway and a geographic span of the transceiver(s) of the asynchronous RF network:
at the level of said A-GNSS server:
determining the time-of-day at which data proportional to said at least one time of arrival difference have been computed by said at least one node in function of the extracted time-stamp is also performed in function of said characteristic data about the asynchronous RF network.

12. The method according to claim 10, further comprising, with the A-GNSS server storing the up-to-date ephemeris of the satellites of the GNSS constellation:

at the level of said A-GNSS server:
  determining the geographic position of said at least one node device in function of the determined time-of-day and said data proportional to said at least two time of arrival differences.

13. The method according to claim 10, wherein, said at least one node device comprises a non-transitory computer readable medium for storing at least data about its position with an accuracy of less than three hundreds kilometers, said data packet further carries said data about the approximate position of said at least one node, and wherein:
  extracting the time-stamp further comprising extracting said data about the approximate position of said at least one node device from said time-stamped data packet.

14. The method according to claim 10, further comprising, with said at least one transceiver comprising a non-transitory computer readable medium for storing data about its position:
  at the level of said at least one transceiver:
    adding data about the position of said at least one transceiver, in addition to the time-stamp, for generating the time-stamped data packet, and wherein:
    extracting the time-stamp further comprising extracting said data about the position of said at least one transceiver (300) from said time-stamped data packet.

15. The method according to claim 10, wherein asynchronously emitting the data packet issued from said at least one node device is performed after a determined delay, said data packet further carrying a value of said determined delay, said determined delay being potentially randomly generated by said at least one node device, and preferably wherein asynchronously emitting the data packet issued from said at least one node device is performed repeatedly, for instance according to a determined number of times, and wherein:
  extracting the time-stamp further comprising extracting said value of said determined delay from said time-stamped data packet.

16. System for providing assistance to geolocation of at least one node device of an asynchronous radio frequency (RF) network by implementing at least one transceiver, each of said at least one node device comprising a global satellite navigation system (GNSS) receiver, and the asynchronous RF network being connected through at least one transceiver acting as a gateway to a backend network which houses an A-GNSS server, the system being designed for implementing a method for providing assistance to geolocation of said at least one node device, the method comprising the steps consisting in:
  at the level of said GNSS receiver of said at least one node device:
    receiving at least three GNSS signals from visible GNSS satellites,
    computing data proportional to at least two time of arrival differences between receptions of predetermined signal sequences of said at least three GNSS signals taken in pairs;
    generating a data packet comprising said data proportional to said at least two time of arrival differences, and
    asynchronously emitting the data packet towards said at least one transceiver; and
  at the level of said at least one transceiver:
    receiving said data packet; and
    adding a time-stamp to said data packet for generating a time-stamped data packet,
    emitting said time-stamped data packet toward a A-GNSS server,
  at the level of said at least one transceiver acting as a gateway:
    sending said time-stamped data packet to said A-GNSS server,
  at the level of said A-GNSS server:
    receiving said time-stamped data packet,
    extracting the time-stamp and said data proportional to said at least two time of arrival differences from said time-stamped data packet,
    for at least one time of arrival difference, determining the time-of-day at which data proportional to said at least one time of arrival difference have been computed by said at least one node device in function of the extracted data among which at least the extracted time-stamp, and
    determining the geographic position of said at least one node device in function of at least the determined time-of-day and said data proportional to said at least two time of arrival differences.

* * * * *